United States Patent Office
3,504,071
Patented Mar. 31, 1970

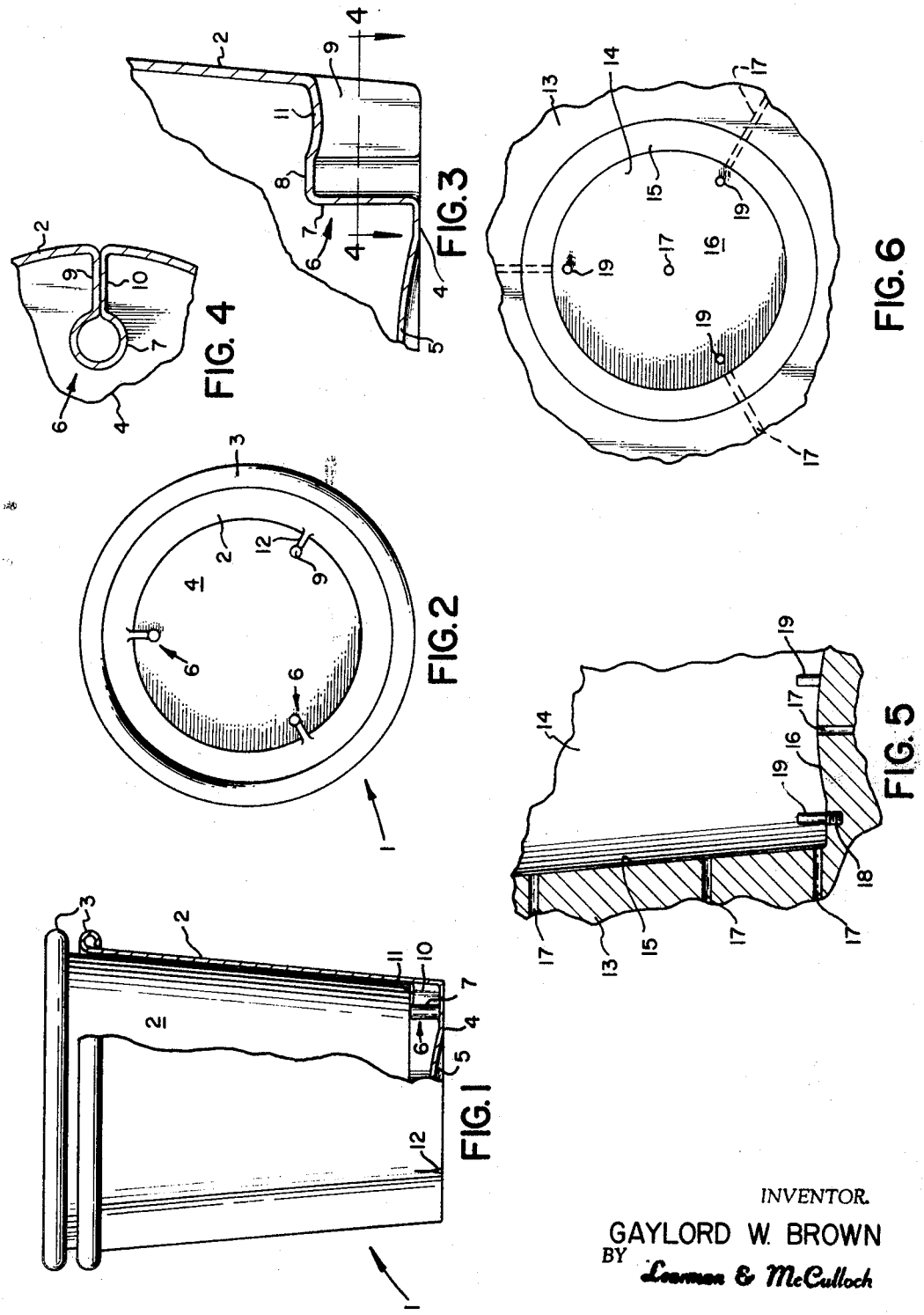

3,504,071
METHOD OF MAKING STACKABLE CONTAINERS AND APPARATUS FOR THEIR MANUFACTURE
Gaylord W. Brown, Beaverton, Mich., assignor to Brown Machine Company of Michigan, Inc., a corporation of Michigan
Filed June 27, 1966, Ser. No. 560,534
Int. Cl. B29c 17/04
U.S. Cl. 264—92       2 Claims

ABSTRACT OF THE DISCLOSURE

Differential pressure forming of a stackable container wherein a sheet of heated, thermoplastic material is deformed into a mold cavity having pins upstanding from the bottom of a cavity and spaced from the inner wall thereof so as to interrupt movement of portions of the plastic sheet toward the cavity bottom and form upstanding protuberances at the bottom of a container. The portions of the plastic sheet adjacent the interrupted portions continue to move during the molding process so as to surround the upstanding pins and form confronting, double thickness walls which extend radially outwardly from the projections.

---

This invention relates to a stackable or nestable container construction and to apparatus and methods for its manufacture, and more particularly to the manufacture of plastic stackable containers by differential pressure forming apparatus.

It is common practice in the plastic container art to provide nestable or stackable containers capable of being telescoped one within another and in which a ledge or seat is provided near the closed end of each container for engagement by the closed end of a nested container so as to prevent undue telescoping and facilitate the removal of individual containers from a stack by automatic means of the kind conventionally found in coin operated beverage dispensing machinery. It is not uncommon for a container of the general class described to be provided with an interior, continuous ledge adjacent the container's closed end and to form such containers by means of differential pressure forming molding machines. The provision of such a contiuous ledge has certain disadvantages. For example, such a ledge tends to reduce the capacity of the container, thereby requiring the side wall of the container to be elongated if the container is to be capable of accommodating a specified quantity of liquid. Furthermore, the mold die or dies by means of which the container is formed are more difficult to manufacture and use.

It has been found that the benefits of the continuous ledge or seat of prior constructions can be obtained by simple projections provided in a container adjacent its closed end. Such projections can be few in number, do not decrease materially the capacity of the container, and perform just as effectively as a continuous ledge or seat.

An object of this invention is to provide a method and apparatus for producing a container having self-contained, discrete and integral means for enabling similar containers to be nested in a controlled stacked condition in such manner as to facilitate unstacking of the containers one by one.

Another object of the invention is to provide a method and apparatus producing a stackable container having means therein for supporting a similar container and in which the supporting means is discontinuous so as to minimize the container space occupied thereby.

A further object of the invention is to provide a method and apparatus for producing a nestable container of the character described and which readily lends itself to mass production by differential pressure forming techniques.

Another object of the invention is to provide simplified, relatively inexpensive mold apparatus and methods for producing stackable containers of the character set forth.

Other objects and advantages of the invention will be pointed out specifically or will become apparent from the following description when it is considered in conjunction with the appended claims and the accompanying drawing, in which:

FIGURE 1 is a view partly in elevation and partly in section of two containers constructed in accordance with the invention and arranged in stacked relation;

FIGURE 2 is a top plan view of one of the containers shown in FIGURE 1;

FIGURE 3 is a fragmentary, enlarged, sectional view of a detail of the construction disclosed in FIGURE 1;

FIGURE 4 is a sectional view taken on the line 4—4 of FIGURE 3;

FIGURE 5 is a fragmentary, sectional view of a portion of a mold for forming containers according to the invention; and FIGURE 6 is a top plan view of the mold shown in FIGURE 5.

A container constructed in accordance with the invention is designated generally by the reference character 1 and comprises a tapering annular side wall 2 terminating at its open end in a beaded or rolled rim 3 and having a closure wall 4 at its opposite end. The central portion of the wall 4 preferably is inwardly bowed as at 5, and it is preferred that the cylindrical wall 2 taper inwardly from its open end toward its closed end so as to facilitate nesting of one container within another.

Containers such as are herein disclosed conventionally are placed in coin operated vending machines in stacks from which individual containers are withdrawn in response to the depositing of one or more coins. The separation of individual containers from the stack usually is accomplished by automatically operable means which may be interposed between the rims of adjacent containers so as to effect separation of either the uppermost or lowermost container in a stack from the remaining containers. Accordingly, it is desirable to provide spacing between the rims 3 of adjacent containers when the containers are in stacked or nested condition.

A container constructed in accordance with the disclosed embodiment of the invention is provided with a plurality of discrete, hollow support webs or protuberances 6 which are so located as to engage and support the bottom wall 4 of a nested container. Each support 6 comprises a generally cylindrical wall 7 integrally joined to the bottom wall 4 and extending longitudinally inwardly of the container a distance sufficient to engage the bottom wall 4 of a nested container and space the adjacent rims 3 a desired distance apart. The wall 7 has a closure wall 8 at its inner end and two substantially parallel, contiguous webs 9 and 10 confronting one another to form double thickness walls that are joined integrally to the walls 7 and 8 and to the side wall 2. The upper or inner ends of the webs 9 and 10 merge to form a smooth wall 11. In the formation of the container, the radially outer ends of the webs 9 and 10 may flare slightly to provide a small recess 12 in the outer wall of the container.

In the preferred embodiment of the container there are three identical supports 6 which are circumferentially spaced uniformly from each other, but more or fewer supports may be provided if desired.

The supports 6 occupy relatively little space in the container and, therefore, do not materially decrease the capacity of the container. Moreover, the construction of each support is such that each support is joined to both of the walls 2 and 4, thereby enabling the walls 8 and 11 and the webs 9 and 10 to rigidify the closed end of the container so as to enable it to withstand substantial radial loads.

A container according to the invention may be formed by differential pressure molding apparatus comprising a block or body 13 in which is a cavity 14 having side and bottom walls 15 and 16, respectively, complementary to the shape of the corresponding container walls. In connection with the cavity 14 is a plurality of passages 17 which may communicate with a source of vacuum so as to evacuate the cavity during molding operations in the usual manner and draw the heated thermoplastic material being used into intimate engagement with the cavity walls. The bottom wall 16 may be provided with threaded openings 18 for the removable accommodation of correspondingly threaded pins 19 which are radially spaced from the side wall 15 and project above the bottom wall 16. Each pin 19 is adapted to form one of the supports 6 of the container 1.

In the formation of a container, a sheet of plastic material such as polystyrene, polypropylene, polyethylene, or any other suitable plastic may be placed over the cavity 14 in a suitably heated condition whereupon the partial evacuation of the cavity 14 will cause the plastic material to be deformed into the cavity and take the shape of the latter. As the plastic material is drawn toward the cavity bottom 16, the pins 19 will interrupt movement of portions of the sheet toward the bottom wall 16, but the remaining portions of the sheet will continue moving toward the bottom and side wall so as to surround the pins 19 to form the webs 9 and 10 and the walls 8 and 11. The container so formed then may be stripped from the mold cavity in the usual manner and be subsequently provided with the rim 3 by conventional processes.

This disclosure illustrates presently preferred embodiments of the container and the method and apparatus for its manufacture but is intended to be illustrative rather than definitive of the invention.

I claim:

1. Molding apparatus for molding a hollow container having an open end and a closed end, said apparatus comprising a die having side and bottom walls defining a cavity over which plastic sheet material to be molded may be placed; means for creating a differential pressure on opposite sides of said plastic sheet to draw said plastic material into said cavity in engagement with said side and bottom walls; and separated projections, secured to said bottom wall in a position closely adjacent but spaced from side wall, and extending into said cavity in the path of plastic material drawn into said cavity to provide bottom wall protuberances in said container extending into the hollow interior thereof which connect with the side wall of the container by a double wall web.

2. A method of molding a plastic container comprising: creating a differential pressure on opposite sides of a heated, deformable, thermoplastic sheet to move it into a mold cavity having side and bottom walls and a plurality of angularly spaced, upstanding protuberances and form a side and bottom wall therein, interrupting the movement of portions of said sheet toward the bottom wall of said cavity at said plurality of angularly spaced protuberances while continuing the movement of the remaining portions of said sheet toward the bottom and side walls of said cavity until the sheet portions adjacent the interrupted portions thereof confront one another and form a double thickness wall substantially radially from said interrupted portions toward the side wall of said cavity.

References Cited

UNITED STATES PATENTS

| | | | |
|---|---|---|---|
| 2,985,914 | 5/1961 | Miller | 18—19 |
| 3,190,530 | 6/1965 | Edwards | 229—1.5 |
| 3,214,797 | 11/1965 | Ollier et al. | 264—296 X |
| 3,126,582 | 3/1964 | Scott | 18—19 |
| 3,160,920 | 12/1964 | Busch | 18—35 |

ROBERT F. WHITE, Primary Examiner

T. J. CARVIS, Assistant Examiner

U.S. Cl. X.R.

18—19; 264—93, 318